(12) United States Patent
Syed et al.

(10) Patent No.: US 9,056,617 B2
(45) Date of Patent: Jun. 16, 2015

(54) SYSTEMS AND METHODS FOR DETECTING ACCELERATOR PEDAL FAILURE

(75) Inventors: Fazal Urrahman Syed, Canton, MI (US); Venkatapathi Raju Nallapa, Dearborn, MI (US); Mathew Alan Boesch, Plymouth, MI (US); Johannes Geir Kristinsson, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 13/310,276

(22) Filed: Dec. 2, 2011

(65) Prior Publication Data

US 2013/0144481 A1    Jun. 6, 2013

(51) Int. Cl.
| | |
|---|---|
| *G01M 15/04* | (2006.01) |
| *G06F 19/00* | (2011.01) |
| *B60W 50/038* | (2012.01) |
| *B60K 26/04* | (2006.01) |
| *B60W 50/02* | (2012.01) |

(52) U.S. Cl.
CPC ............. *B60W 50/038* (2013.01); *B60K 26/04* (2013.01); *B60K 2026/046* (2013.01); *B60W 2050/0215* (2013.01)

(58) Field of Classification Search
CPC .......... B60W 50/38; B60W 2050/215; B60K 2026/46; B60K 26/04
USPC ....................................................... 701/29.2
See application file for complete search history.

(56) References Cited

U.S. PATENT DOCUMENTS

| | | | |
|---|---|---|---|
| 4,488,527 A * | 12/1984 | Pfalzgraf et al. ............... | 123/399 |
| 4,519,360 A * | 5/1985 | Murakami .................... | 123/399 |
| 4,640,248 A | 2/1987 | Stoltman | |
| 4,881,502 A | 11/1989 | Kabasin | |
| 5,074,267 A * | 12/1991 | Ironside et al. ............... | 123/399 |
| 5,109,819 A * | 5/1992 | Custer et al. ............. | 123/339.15 |
| 5,193,506 A * | 3/1993 | Ironside et al. ............... | 123/399 |
| 5,235,951 A * | 8/1993 | Taguchi et al. ............... | 123/397 |
| 5,255,653 A * | 10/1993 | Ironside et al. ............... | 123/399 |
| 5,263,448 A | 11/1993 | Bluhm et al. | |
| 5,381,769 A * | 1/1995 | Nishigaki et al. .............. | 123/399 |
| 5,950,597 A * | 9/1999 | Kamio et al. ................. | 123/397 |
| 6,199,535 B1 * | 3/2001 | Hara ............................. | 123/396 |
| 6,273,061 B1 * | 8/2001 | Hosoi ........................... | 123/333 |
| 6,488,007 B2 * | 12/2002 | Satou et al. ................... | 123/396 |

(Continued)

OTHER PUBLICATIONS

Roberts, Charles C., Jr., "The Throttle Control System Defects and Collsions,", Claims Magazine, Aug. 2011, pp. 21-22.*

(Continued)

*Primary Examiner* — Calvin Cheung
*Assistant Examiner* — Allen E Quillen
(74) *Attorney, Agent, or Firm* — Jones Robb, PLLC; Raymond L. Coppiellie (57) ABSTRACT

A system for detecting accelerator pedal failure in an accelerator pedal system including a vehicle control system, the pedal failure detecting system having an accelerator pedal; a pedal arm; a sensor configured to interpret a force applied to the accelerator pedal and further configured to transmit a signal as a sensor output to the vehicle control system, wherein the vehicle control system is configured to correlate the sensor output to an accelerator pedal position, and to indicate a failure condition when it is not feasible the to read the sensor output given the accelerator pedal position. A method for detecting accelerator pedal failure conditions in an accelerator pedal system.

21 Claims, 4 Drawing Sheets

(56) References Cited

U.S. PATENT DOCUMENTS

| | | | |
|---|---|---|---|
| 6,751,544 B2* | 6/2004 | Hashimoto et al. | 701/107 |
| 6,799,110 B2* | 9/2004 | Hashimoto et al. | 701/62 |
| 6,920,385 B2* | 7/2005 | Egami | 701/70 |
| 6,964,260 B2* | 11/2005 | Samoto et al. | 123/406.13 |
| 7,076,358 B2* | 7/2006 | Egami | 701/70 |
| 7,121,258 B2* | 10/2006 | Nakamoto et al. | 123/399 |
| 7,434,565 B2* | 10/2008 | Miyachi | 123/399 |
| 7,603,980 B2* | 10/2009 | Watanabe | 123/399 |
| 7,848,859 B2* | 12/2010 | Homeyer et al. | 701/33.9 |
| 8,126,609 B2* | 2/2012 | Kimura et al. | 701/29.2 |
| 2006/0022518 A1* | 2/2006 | Manaka et al. | 303/122 |
| 2008/0097677 A1* | 4/2008 | Kawakami | 701/99 |
| 2010/0100278 A1* | 4/2010 | Saito | 701/34 |
| 2010/0179719 A1* | 7/2010 | Kimura et al. | 701/31 |
| 2011/0190979 A1* | 8/2011 | Monti | 701/35 |
| 2012/0143441 A1* | 6/2012 | Yamazaki et al. | 701/36 |

OTHER PUBLICATIONS

Roberts, Charles C., Jr., "The Throttle Control System Defects and Collsions,", Claims Magazine, Aug. 2011, pp. 21 -22.*

* cited by examiner

SYSTEMS AND METHODS FOR DETECTING ACCELERATOR PEDAL FAILURE

TECHNICAL FIELD

The present teachings relate generally to systems and methods for controlling the acceleration pedal in motor vehicles. More specifically, the present teachings relate to systems and methods for preventing unintended acceleration from pedal failure or malfunction, including an improved design of an accelerator pedal with a sensor, which can detect unintended accelerator pedal failure at different ranges and pedal positions.

BACKGROUND

In motor vehicles, the accelerator pedal is used to regulate power demand from a driver. In regulating the amount of power or acceleration demanded by the driver, existing accelerator pedals typically use two-track or three-track resistive sensors to detect failures or malfunctions. For example, a two track accelerator pedal utilizes two resistive sensors with different transfer function to represent the accelerator pedal position or pedal travel and movement. The use of two resistive sensors in two-track accelerator pedals or three resistive sensors in three-track accelerator pedals provides successful detection of many failures as they are occurring. For example, in a pedal with two-track resistive sensors, a failure in one sensor can be detected by the other functionally operational sensor since the transfer functions of the two resistive sensors are different. However, two-track and three-track resistive sensors may not be able to detect failures that are not captured by respective resistive sensors when such sensors are operating as depicted by their transfer functions. Additionally, two-track and three-track resistive sensors cannot detect the specific condition under which the failure may occur. For example, existing sensors may not be able to detect failure conditions where accelerator pedal failure occurs when the accelerator pedal becomes stuck or lodged at different positions due to, for example, corrosion of the pedal arm, or obstructions, such as improper mat usage or placement. Under such conditions, the two-track or three-track resistive sensor based accelerator pedal will report a fixed position for the accelerator pedal, whereas such a fixed position is not what is being desired or requested by the driver. These failure conditions, which can manifest themselves as accelerator pedal disturbances, are typically relayed to a vehicle system controller, and ultimately may affect the power output of the motor vehicle, in effect creating an inaccurate demand for power output. Thus, to meet driver expectations with regard to the specific demand for power output or acceleration from the driver, it can be advantageous for accelerator pedal systems to have the ability to detect such disturbances, as well as the ability to prevent unintended accelerator pedal failure.

Accordingly, some existing accelerator pedals include a force sensor mounted on the accelerator pedal to detect a force being applied to the accelerator pedal in relation to various positions of the accelerator pedal. However, even existing systems including a force sensor on the accelerator pedal are not designed to detect conditions that lead to the failures described above. Additionally, many existing detection systems are limited in what failure conditions they are detecting and how they respond to such conditions. Therefore, there is a need for a system that can detect failure conditions and prevent unintended accelerator pedal system failure in motor vehicles.

SUMMARY

In accordance with various exemplary embodiments, the present teachings provide a system and method for detecting accelerator pedal system failure. The present teachings further provide a system for detecting accelerator pedal failure in an accelerator pedal system including a vehicle control system, the pedal failure detecting system comprising: an accelerator pedal; a pedal arm; a sensor configured to interpret a force applied to the accelerator pedal and further configured to transmit a signal as a sensor output to the vehicle control system, wherein the vehicle control system is configured to correlate the sensor output to an accelerator pedal position, and to indicate a failure condition when it is not feasible to read the sensor output given the accelerator pedal position.

The present teachings further provide a system for detecting accelerator pedal failure in an accelerator pedal system, wherein a pedal failure condition is indicated when the sensor output represents a low force and the accelerator pedal position is medium or at about 50% of a resting position.

The present teachings further provide a system for detecting accelerator pedal failure in an accelerator pedal system, wherein a pedal failure condition is indicated when the sensor output represents a low force and the accelerator pedal position is high or at about 100% of a resting position.

The present teachings further provide a system for detecting accelerator pedal failure in an accelerator pedal system, wherein a sensor error is indicated when the sensor output represents a high force and the accelerator pedal position is low or at about 0% of a resting position.

The present teachings further provide a system for detecting accelerator pedal failure in an accelerator pedal system, wherein a sensor error is indicated when the sensor output represents a medium force and the accelerator pedal position is low or at about 0% of a resting position.

The present teachings further provide a system for detecting accelerator pedal failure in an accelerator pedal system, wherein a possible sensor error is indicated when the sensor output represents a medium force and the accelerator pedal position is high or at about 100% of a resting position.

The present teachings further provide a system for detecting accelerator pedal failure in an accelerator pedal system, wherein a possible sensor error is indicated when the sensor output represents a high force and the accelerator pedal position is medium or at about 50% of a resting position.

The present teachings further provide a system for detecting accelerator pedal failure in an accelerator pedal system, wherein the failure condition is due to a sensor error.

The present teachings further provide a system for detecting accelerator pedal failure in an accelerator pedal system, wherein the failure condition is due to an accelerator pedal disturbance.

The present teachings further provide a system for detecting accelerator pedal failure in an accelerator pedal system, wherein the accelerator pedal disturbance is due to corrosion of the pedal arm.

The present teachings further provide a system for detecting accelerator pedal failure in an accelerator pedal system, wherein the accelerator pedal disturbance is due to an improper mat placement.

The present teachings further provide a system for detecting accelerator pedal failure in an accelerator pedal system, wherein the sensor is configured to interpret the force according to a predetermined force measurement.

The present teachings further provide a system for detecting accelerator pedal failure in an accelerator pedal system, wherein the vehicle control system is further configured to transmit a notification to the driver if the failure condition indicates a vehicle safety issue.

The present teachings provide a method for detecting accelerator pedal failure conditions in an accelerator pedal system, the method comprising: interpreting a force applied to the accelerator pedal; transmitting a signal indicative of the force to a vehicle control system; measuring an accelerator pedal position; correlating the signal with a measurement of an accelerator pedal position to detect a failure condition or a non-failure condition; adjusting a power output of a motor vehicle according to the failure condition or non-failure condition.

The present teachings further provide a method for detecting accelerator pedal failure conditions in an accelerator pedal system, wherein power output is permitted when the accelerator pedal system is operating under a non-failure condition.

The present teachings further provide a method for detecting accelerator pedal failure conditions in an accelerator pedal system, wherein power output is not permitted when the accelerator pedal system is operating under a failure condition.

The present teachings further provide a method for detecting accelerator pedal failure conditions in an accelerator pedal system, further comprising providing feedback notification if the failure condition indicates a safety issue.

The present teachings further provide a method for detecting accelerator pedal failure conditions in an accelerator pedal system, further comprising providing a warning to a motor vehicle driver if the failure condition persists.

Additional objects and advantages of the present teachings will be set forth in part in the description which follows, and in part will be obvious from the description, or may be learned by practice of the present teachings. Various objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings.

The accompanying drawings, which are incorporated in and constitute a part of this specification, illustrate embodiments of the present teachings and together with the description, serve to explain the principles of the present teachings.

BRIEF DESCRIPTION OF THE DRAWINGS

At least some features and advantages will be apparent from the following detailed description of embodiments consistent therewith, which description should be considered with reference to the accompanying drawings, wherein:

FIGS. 2A-2C make up a flow chart illustrating a method of using an exemplary system of the present teachings, the flow chart depicting a method for detecting accelerator pedal system failure conditions based on feedback from the sensor and the accelerator pedal position;

Although the following detailed description makes reference to illustrative exemplary embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The illustrated exemplary embodiments are not intended to limit the disclosure. To the contrary, the disclosure is intended to cover alternatives, modifications, and equivalents.

A vehicle's speed and acceleration can be controlled in part by the demand for acceleration provided by the driver of the vehicle through applied force from the driver to the accelerator pedal. The driver's expectations for acceleration are directly related to the amount of force the driver applies to the accelerator pedal, such that when a certain amount of force is applied to the accelerator pedal, the driver expects a correlated amount of power output in the form of propulsive torque or acceleration from the vehicle. An adaptable system for detecting the responsiveness of the accelerator pedal in relation to the amount of applied force and the resultant power output is an important component to meeting the driver's expectations. In particular, a system for detecting accelerator pedal system failure, that additionally includes a corrective function, is a valuable feature in a motor vehicle. The more accurately failure conditions can be identified and corrected, the more accurately a vehicle's accelerator pedal system can relay the proper power output demanded by a driver to the vehicle control system. Detection and correction of failure conditions can provide a more accurate driving experience for the driver, as well as increase the safety of operating the motor vehicle. The detection of failure conditions can additionally provide drivers with critical information regarding vehicle safety, such as, for example, vehicle stability problems and pedal corrosion or deterioration.

As used herein, the term "failure condition," or variants thereof, refers to any situation, which results in an abnormal mode of operation of the accelerator pedal system. A failure condition may be caused by a disturbance with the accelerator pedal, such as, for example, an obstruction due to floor mat misplacement, or debris and/or corrosion interfering with the functional movement of the accelerator pedal or the pedal arm. A failure condition may also occur as a result of a sensor error, for example, where the sensor malfunctions due to an electrical shortage, misreads data input, or sends an incorrect signal to a vehicle control system.

To enable accurate detection of a failure condition of an accelerator pedal system, various exemplary embodiments of the present teachings contemplate using a sensor to interpret a force applied to the accelerator pedal and to provide one or more signals indicative of the force as sensor output (SENS) to a vehicle control system, which uses the one or more signals to ultimately generate, in part, an accurate corresponding power output for the motor vehicle. The vehicle control system also interprets signals relaying a current accelerator pedal position (APP) in relation to a resting accelerator pedal position. The vehicle control system correlates the APP and SENS signals with other vehicle control systems in order to detect and correct the failure condition to provide an accurate and responsive power output to meet driver expectation.

In general, a vehicle control system (VCS), such as, for example, a powertrain control module (PCM), uses either two-track or three-track based accelerator pedal position transfer functions (as a function of voltage), respectively, which are checked for consistency between the two or the three transfer functions, respectively. From this, then, an accelerator pedal position is computed. For example, after passing a consistency check between the transfer functions, an acceleration pedal position is determined based on the actual pedal position. In the event of a mismatch or failing of the consistency check between the transfer functions, a safe pedal position is reported to the vehicle control system (VCS), which will result in minimal torque at the wheel and hindering of acceleration of the motor vehicle.

Thus, in accordance with various exemplary embodiments, the present teachings provide a system and methods for detecting accelerator pedal system failure. As depicted in the schematic diagram of FIG. 1, the accelerator pedal system 10 may comprise an accelerator pedal 12 and a sensor 14. The sensor 14 can be, for example, integrally engaged with the accelerator pedal 12. It is contemplated that the accelerator pedal 12 may have the shape and size of an accelerator pedal of any motor vehicle, including standard accelerator pedals or more specialized accelerator pedals.

Figure 1:
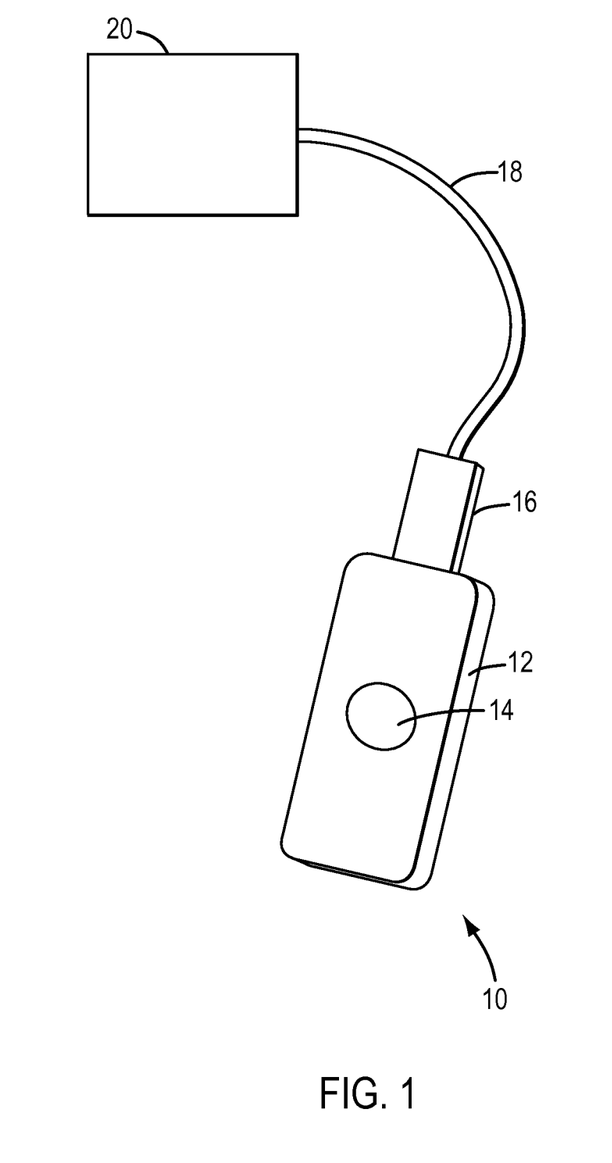
FIG. 1 is a schematic diagram illustrating an exemplary embodiment of an accelerator pedal system in accordance with the present teachings, depicting an accelerator pedal, a sensor, a pedal arm, a vehicle system controller and certain vehicle system connectors.

The accelerator pedal 12 may also attach to a pedal arm 16 that communicates directly and/or indirectly with other vehicle systems, including, but not limited to, a vehicle control system 20, a vehicle motor (not shown), and a throttle (not shown), for example, mechanically and/or electronically through vehicle control connectors 18. It is contemplated that the vehicle control connectors 18 may include the necessary mechanical and electrical links for communicating between the vehicle control systems and can include, for example, mechanical, electrical, or wireless linkages, or a combination thereof. It is known in the art that a Controller Area Network (CAN), for example, is commonly used as a communication link between the vehicle control systems. Similarly, a Serial Peripheral Interface (SPI) is also used as communication link between internal vehicle systems.

The sensor 14 can be any of a variety of known sensors used in motor vehicles, including but not limited to, a load sensor, a force sensor, a pressure sensor, a piezoelectric sensor or a strain gauge resistive sensor. The sensor 14 can be integrally engaged with the accelerator pedal 12. The term "integrally engaged" as used herein, means that the sensor 14 is positioned in such a way that it is able to communicate mechanically and/or electronically with the accelerator pedal 12. For example, the sensor 14 may be embedded within the accelerator pedal 12, such that the sensor 14 is permanently situated within the accelerator pedal 12. It is contemplated that the sensor 14 may also be removable or non-permanently situated within the accelerator pedal 12. It is further contemplated that the sensor 14 may rest in a preformed cavity within the accelerator pedal 12, or alternatively, be positioned on top of the accelerator pedal 12 or partially embedded in the accelerator pedal 12. Further embodiments may be contemplated where the sensor 14 can snap into the accelerator pedal 12, or be fastened or held into place on the accelerator pedal 12. It is further contemplated that the sensor 14 may not be mechanically attached to the accelerator pedal 12 and may only form an electrical connection with the accelerator pedal 12. It is contemplated that any number of spatial, mechanical and electrical arrangements may be configured between the sensor 14 and the accelerator pedal 12, and therefore, the embodiments described herein are not meant to be limiting.

Various exemplary embodiments of the present teachings further contemplate using more than one sensor to interpret and transmit signals of current accelerator pedal position (APP) and signals indicative of a force applied to the accelerator pedal (SENS). The acceleration pedal system 10 may include existing vehicle sensors when available, such as, for example, one or more throttle position sensors (not shown), traction control sensors (not shown), and other engine sensors (not shown). Because some existing vehicles may already contain the above sensors, certain embodiments of the present teachings contemplate using only existing sensors in the acceleration pedal system and vehicle control systems. Embodiments of the present teachings also contemplate vehicle control systems including additional sensors as needed to interpret and transmit signal output used in the systems and methods of the present teachings.

As illustrated in FIG. 1, the sensor 14 may be situated within the accelerator pedal 12, such that it is configured to interpret a force applied upon the accelerator pedal 12 by a driver, and generate signals indicative of a force applied to the accelerator pedal (SENS) that is communicated to the vehicle control system 20 through one or more vehicle control connectors 18, which may be mechanical, electrical, or wireless linkages, or a combination thereof. The vehicle control system 20 may also be configured to receive a signal relaying a current accelerator pedal position (APP) in relation to a resting accelerator pedal position. Upon interpreting at least the signals of the current accelerator pedal position (APP) and indicative of a force applied to the accelerator pedal (SENS), the vehicle control system 20 can interpret this information, along with other functions, such as, for example, fuel economy, exhaust emissions, performance, and drivability, to generate a coordinated power output, such as acceleration of the motor vehicle that is responsive to the driver demand for power output. It is contemplated that the vehicle control system 20 may communicate with other vehicle control systems during this process, even though many of the other vehicle control systems are not specifically described herein. For example, it is contemplated that the vehicle control system 20 may directly or indirectly transmit signals, including signals indicative of a force applied to the accelerator pedal (SENS) and the current accelerator pedal position (APP), to, for example, a throttle controller, a fuel injection controller, a traction control system, and antilock brake systems. It is also contemplated that there may be any number of vehicle control systems that can be combined or grouped together to form additional different vehicle control systems, and therefore, the vehicle control systems are not meant to be mutually exclusive from each other and some overlap between vehicle control systems is to be contemplated. It is further contemplated that the vehicle control system 20 can interpret and transmit a wide variety of signals, in addition to signals indicative of a force applied to the accelerator pedal (SENS) and the current accelerator pedal position (APP), including, but not limited to, those from a throttle position sensor or other engine sensors, or a combination thereof.

During operation, the accelerator pedal system 10 of the present teachings is able to detect an accelerator pedal system failure by interpreting signals that indicate a failure condition within the accelerator pedal system. A failure condition may be caused by a disturbance with the accelerator pedal, such as, for example, an obstruction due to floor mat misplacement, or debris and/or corrosion interfering with the accelerator pedal or pedal arm. A failure condition may also occur as a result of a sensor error, for example, where the sensor malfunctions due to an electrical shortage, misreads data input, or interprets or transmits an incorrect signal to a vehicle control system. The signals indicating the sensor error and/or the accelerator pedal disturbance can be communicated to the vehicle control system 20. In general, the communication of this information is performed in a vehicle control system (VSC), such as, for example, a powertrain control module (PCM), by reading the sensor inputs through analog channels in the PCM or the VSC and then the result is provided either through memory read, or SPI or CAN link. Accordingly, the vehicle control system 20 processes the signals indicating the failure condition and transmits an additional signal with a corrective instruction on how to remedy the failure condition and/or an additional signal that sends a warning to the driver. If the failure condition is due to a disturbance with the accelerator pedal, the corrective instruction may include, for example, a process for adjusting the current accelerator pedal position (APP) to correlate to the signals indicative of a force applied to the accelerator pedal (SENS), or a series of mechanical adjustments to dislodge any debris interfering with normal function of the accelerator pedal. If the failure condition is due to a sensor error, the corrective instruction may include, for example, a reset command. If the failure condition cannot be corrected immediately or the failure condition creates an unsafe driving condition for the driver, i.e., creates a safety issue, the corrective instruction may also send a warning to the driver, alerting the driver that operation of the motor vehicle is not recommended. Generally, a safety issues arises when the output shaft torque or wheel torque is greater than the actually intended wheel torque by the driver by a certain amount. It is contemplated that the warning may also provide recommended actions to correct the failure condition or alternative safety instructions for the driver to follow. It is further contemplated that the corrective instruction may include a limited operating strategy (LOS). The term "limited operating strategy" or "LOS" as used herein, indicates a mode of operation where the driver may or may not have the ability to correct the accelerator pedal system failure manually so that the vehicle control system 20 takes over full control of the accelerator pedal system 10 in an effort to correct the current failure condition. Optionally, the vehicle control system 20 takes over full control of the accelerator pedal system 10 and may enter into a safe mode of operation of the vehicle, i.e., by reducing driver wheel torque to values such that failure can be manually corrected or the vehicle can be safely slowed down or stopped. Accordingly, the driver may try to apply additional force to the accelerator pedal 12 in an effort to dislodge debris or remove a misplaced floor mat causing the disturbance of the accelerator pedal 12 failure. In doing this, the accelerator pedal 12 failure may correct itself or the disturbance may be removed (i.e., adjust position of floor mat), and the accelerator pedal 12 may return to a non-failure condition. It is further contemplated that the corrective instruction may shut down operation of the motor vehicle altogether if the failure condition cannot be corrected. The corrective and/or warning instruction is typically provided through instrument clusters, as well as onboard diagnostics and diagnostic codes, together with the corrective action of reducing wheel torque such that the vehicle can be safely slowed down or stopped.

The following table illustrates a summary of different failure conditions of the accelerator pedal system 10, based on a correlation between a range of sensor output (SENS) and accelerator pedal positions.

TABLE 1

| | | Current Accelerator Pedal Position (APP) | | |
| --- | --- | --- | --- | --- |
| | | Low (LO) (~0%) | Medium (ME) (~50%) | High (HI) (~100%) |
| Force Applied to Accelerator Pedal (SENS) | Not Engaged or Low | Pedal OK | Pedal Failure in ME Range | Pedal Failure in HI Range |
| | Medium | Pedal OK Sensor Error | Pedal OK | Pedal OK Possible Sensor Error |
| | Fully Engaged or High | Pedal OK Sensor Error | Pedal OK Possible Sensor Error | Pedal OK |

Table 1 illustrates exemplary results from a method of detecting an acceleration pedal system failure, including the possible cause of the failure condition (i.e., accelerator pedal disturbance or sensor error). The present teachings also contemplate the system providing a recommended adjustment of the power output in response to an accelerator pedal system failure. The power output is computed based on actual vehicle speed and a fail safe accelerator pedal position, such as the resting pedal position. This will ensure that the wheel torque is low enough such that the vehicle can be safely slowed down or stopped.

When a force is applied to accelerator pedal 12, sensor 14 can interpret the force and transmit an associated sensor output signal (SENS). The force-indicative sensor output signal (SENS) is communicated to the vehicle control system 20 through a series of vehicle control connectors 18. The current accelerator pedal position (APP) is also communicated to the vehicle control system 20 through a series of vehicle control connectors 18. Vehicle control system 20 interprets the signals and adjusts the motor vehicle's power output response accordingly. In this situation, the power output is computed-based on actual vehicle speed and accelerator pedal position given that the sensor output signal (SENS) is within an acceptable force-indicative range, such as a low pedal position when the pedal is low or not engaged, a medium pedal position when the pedal is medium or not engaged, and a high pedal position when the pedal is high or fully engaged.

As illustrated in Table 1, depending at least on the combination of the output signal of sensor 14 (SENS) and the position of the accelerator pedal 12 (APP), the signals interpreted by the vehicle control system 20 can be indicative of a range of conditions, including certain failure conditions. As previously described, a failure condition can occur when the accelerator pedal system 10 is considered by the vehicle control system 20 to not be operating under normal or non-failure conditions (i.e., is not responding properly to force applied by the driver). When the accelerator pedal system is determined by the vehicle control system 20 to be responding properly to force applied by the driver, the corresponding amount of power output is permitted by the vehicle control system 20. When the accelerator pedal system is determined by the vehicle control system 20 to not be responding properly to force applied by the driver, a failure condition may exist. A failure condition may be caused, for example, by sensor error or accelerator pedal disturbance.

Under normal driving conditions, there are no disturbances or errors detected from the accelerator pedal 12 or sensor 14. In an exemplary embodiment of the present teachings and in accordance with Table 1 above, the force-indicative output (SENS) of sensor 14 may include one of: (1) low or not engaged; (2) medium; or (3) high or fully engaged. The term "sensor output" as used herein means the output signal transmitted to the vehicle control system 20, which is indicative of a force interpreted by sensor 14 as the force is applied to the accelerator pedal 12 by, for example, the driver. The current accelerator pedal position (APP) is measured relative to a resting position of the accelerator pedal. The resting position of the accelerator pedal 12 is the position that the accelerator pedal 12 assumes at rest, where no external force or disturbance is acting upon the accelerator pedal 12. The current accelerator pedal position (APP) may include one of: (1) low (LO) or 0% from a resting position; (2) medium (ME) or 50% from resting position; or (3) high (HI) or 100% from resting position.

Under normal operation conditions in a typical motor vehicle, when a force is applied to the accelerator pedal 12, the vehicle control system 20, in conjunction with other vehicle systems, including, but not limited to, the ignition and fuel injection systems and throttle systems, permits a coordinated power output in the form of propulsive torque or acceleration of the motor vehicle, responsive to driver demand and expectations. In certain embodiments of the present teachings a system for detecting accelerator pedal failure in an accelerator pedal system 10, including a vehicle control system 20, is described. The pedal failure detecting system comprises an accelerator pedal 12, a pedal arm 16, a sensor 14 configured to interpret a force applied to the accelerator pedal 12 and further configured to transmit a signal as a sensor output (SENS) to the vehicle control system 20, wherein the vehicle control system 20 is configured to correlate the sensor output (SENS) to a current accelerator pedal position (APP) and to indicate a failure condition when it is not feasible to receive the sensor output (SENS) given the accelerator pedal position (APP).

As represented by Table 1, when the force-indicative output (SENS) of sensor 14 is low or not engaged, and the accelerator pedal position (APP) is low or at 0% from resting position (i.e., in the resting position), the accelerator pedal system is considered by the vehicle control system 20 to be operating without error or without failure with no sensor 14 error or accelerator pedal 12 disturbance. When the force-indicative output (SENS) of sensor 14 is low or at 0% from resting position and accelerator pedal position (APP) is medium or 50% from resting position, the accelerator pedal system is considered by the vehicle control system 20 to be operating under a failure condition caused by an accelerator pedal disturbance. As previously described, an accelerator pedal disturbance can be caused by any number of interferences including, but not limited to, obstructions from improper floor mat usage, corrosion of mechanical parts of the accelerator pedal system, a faulty or damaged pedal arm 16, and a combination thereof. When the force-indicative output (SENS) of sensor 14 is low and the current accelerator pedal position (APP) is high or 100% from resting position, the accelerator pedal system is considered by the vehicle control system 20 to be operating under a failure condition caused by an accelerator pedal disturbance. When the force-indicative output (SENS) of sensor 14 is medium and the current accelerator pedal position (APP) is low or 0% from resting position, the accelerator pedal system is considered by the vehicle control system 20 to be operating under a failure condition caused by a sensor 14 error, and the accelerator pedal is considered by the vehicle control system 20 to be without error or without failure. As previously described, a sensor error can be caused by any number of interferences including, but not limited to, corrosion, obstructions, or a combination thereof. When the force-indicative output (SENS) of sensor 14 is medium and accelerator pedal position (APP) is medium or 50% from resting position, the accelerator pedal system is considered by the vehicle control system 20 to be operating without error or without failure.

When sensor output (SENS) is medium and current accelerator pedal position (APP) is high or 100% from resting position, the accelerator pedal system is considered by the vehicle control system 20 to be operating under a failure condition caused by a sensor 14 error, and the accelerator pedal is considered by the vehicle control system 20 to be without error or without failure. When sensor output (SENS) is high or fully engaged and current accelerator pedal position (APP) is low or 0% from resting position, the accelerator pedal system is considered by the vehicle control system 20 to be operating under a failure condition caused by a sensor 14 error, and the accelerator pedal 12 is considered by the vehicle control system 20 to be without error or without failure. When force-indicative output (SENS) of sensor 14 is high or fully engaged and current accelerator pedal position (APP) is medium or 50% from resting position, the accelerator pedal system is considered by the vehicle control system 20 to be operating under a failure condition caused by a possible sensor 14 error, and the accelerator pedal 12 is considered by the vehicle control system 20 to be without error or without failure. When force-indicative output (SENS) of sensor 14 is high or fully engaged and current accelerator pedal position (APP) is high or 100% from resting position, the accelerator pedal system is considered by the vehicle control system 20 to be operating without error or without failure.

Figure 2A:
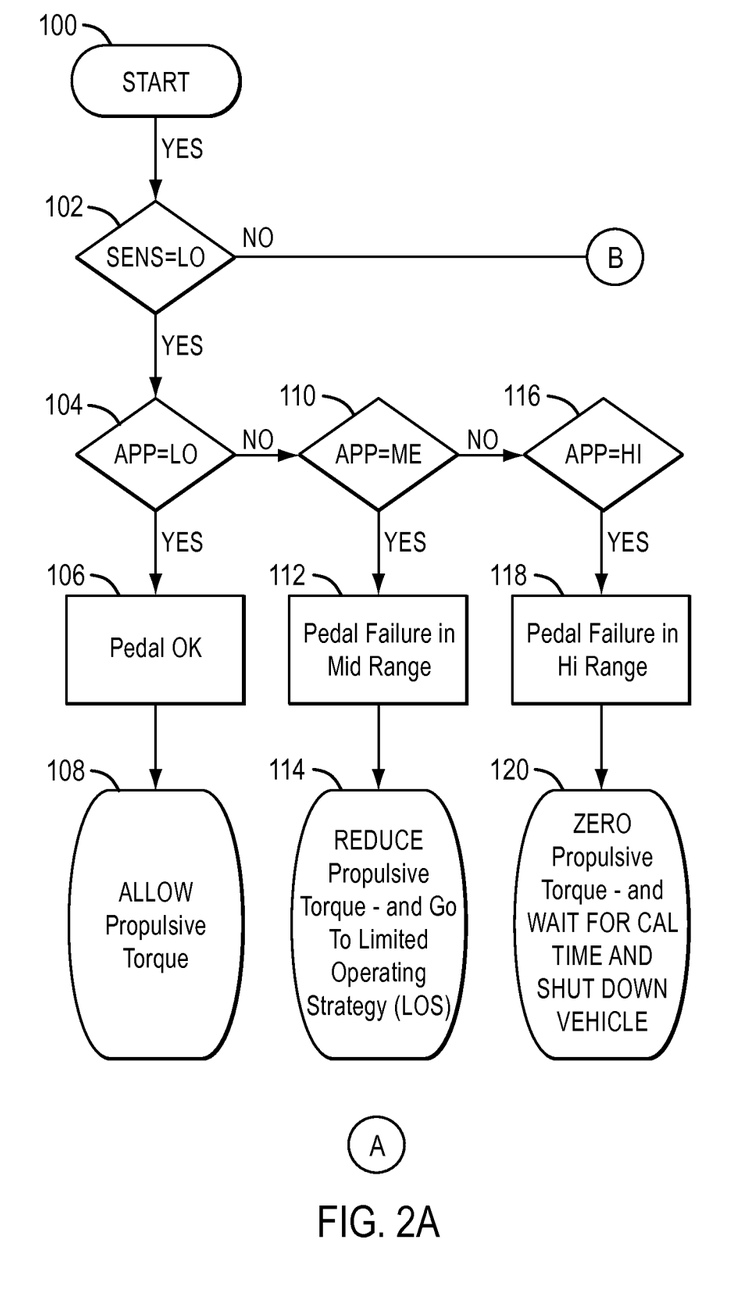
FIG. 2A is a flow chart illustrating a method for detecting accelerator pedal system failure when the sensor output is low or not engaged.
Figure 2B:
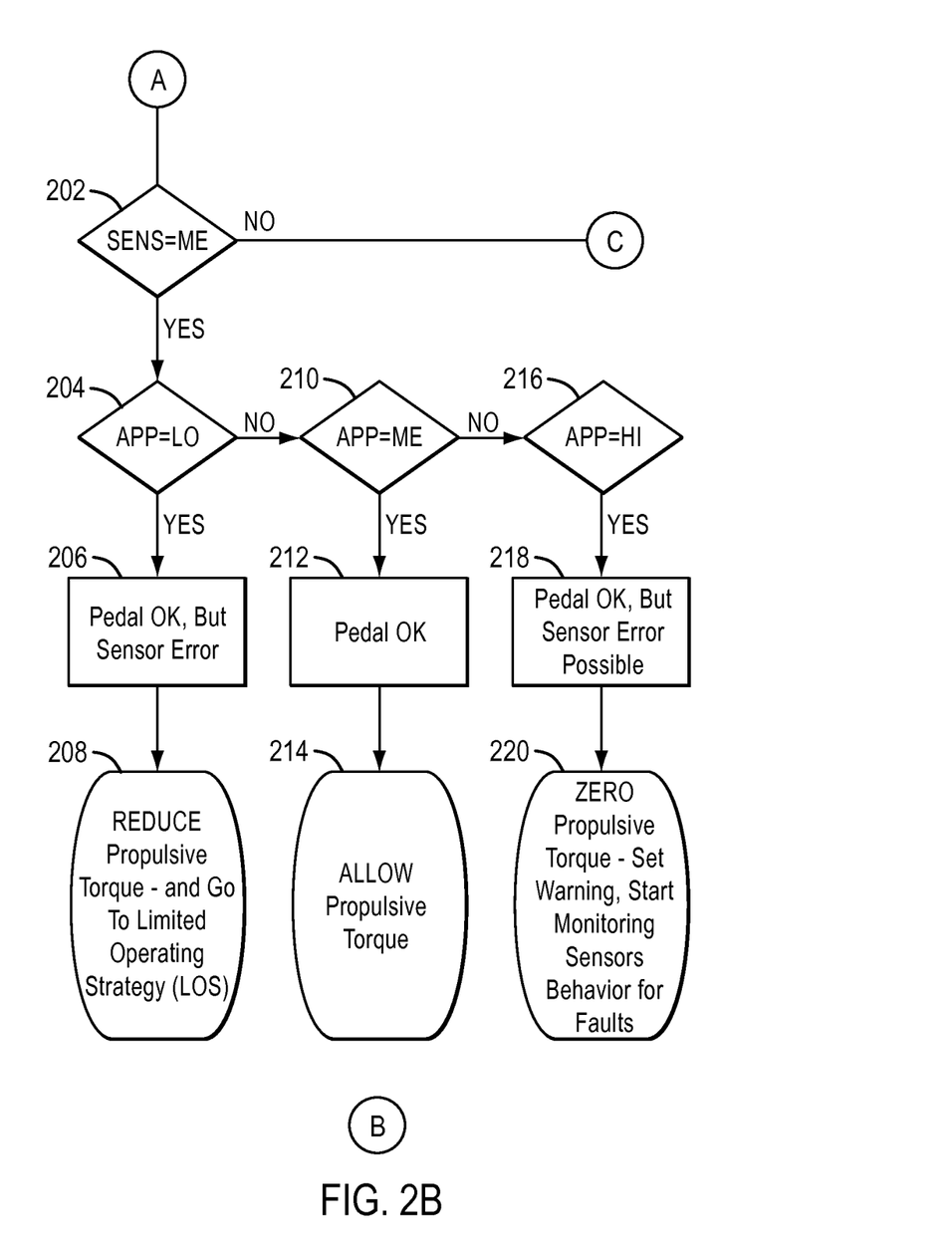
FIG. 2B is a flow chart illustrating a method for detecting accelerator pedal system failure when the sensor output is medium.
Figure 2C:
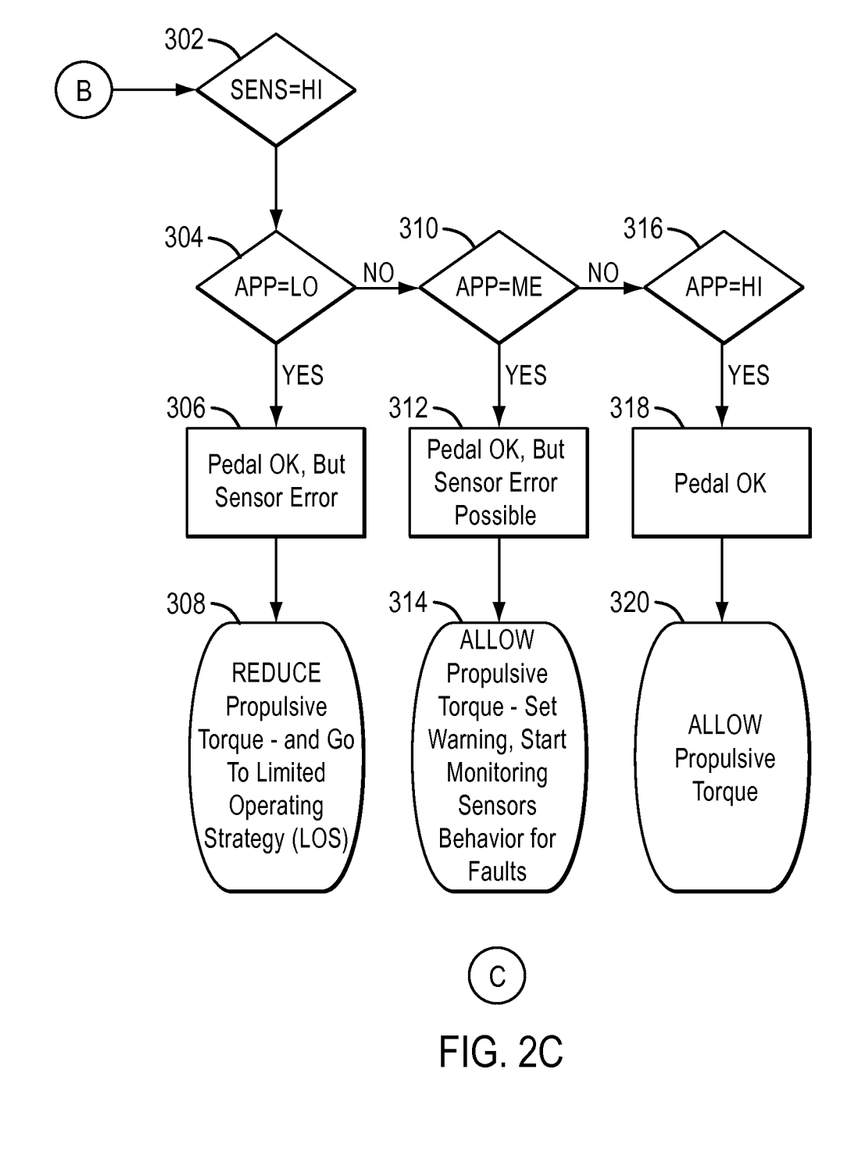
FIG. 2C is a flow chart illustrating a method for detecting accelerator pedal system failure when the sensor output is high or fully engaged.

To further illustrate the accelerator pedal system 10 of the present teachings and an associated method of detecting an accelerator pedal system failure, FIGS. 2A-2C are elements of a flowchart illustrating an exemplary method of operating the accelerator pedal system. In certain embodiments of the present teachings, a method for detecting accelerator pedal failure conditions in an accelerator pedal system 10 is depicted. The method comprises applying a force to the accelerator pedal 12; interpreting the force applied to the accelerator pedal 12; transmitting a signal indicative of the force (SENS) to a vehicle control system 20; correlating the signal with a measurement of a current accelerator pedal position (APP) to detect a failure condition or a non-failure condition; and adjusting power output of a motor vehicle accordingly to the failure condition or non-failure condition.

Accordingly, a method in accordance with the present teachings initially considers whether the force-indicative output (SENS) of the sensor 14 is low, medium, or high. FIG. 2A illustrates an exemplary method followed when the force-indicative output (SENS) of the sensor 14 is low (LO). FIG. 2B illustrates an exemplary method followed when the force-indicative output (SENS) of the sensor 14 is medium (ME). FIG. 2C illustrates an exemplary method followed when the force-indicative output (SENS) of the sensor 14 is high (HI).

In FIG. 2A at step 100, the method for detecting accelerator pedal failure conditions in an accelerator pedal system 10 begins. In step 102, the sensor 14 interprets a force applied to the accelerator pedal 12 (with which the sensor 14 may be integrally engaged), and the sensor 14 transmits a force-indicative output (SENS) to the vehicle control system 20. The accelerator pedal system 10 determines whether the force-indicative output (SENS) is indicative of: (1) low or not engaged; (2) medium; or (3) high or fully engaged. Thereafter, as shown in step 102, the vehicle control system 20 interprets the accelerator pedal position (APP). If, as in step 104, the accelerator pedal position (APP) is low or 0% from resting position (LO), the accelerator pedal system 10 is considered by the vehicle control system 20 to be operating without error or without failure, as shown in 106 ("Pedal OK"). The vehicle control system 20 will permit a power output, such as propulsive torque or acceleration of the motor vehicle, as depicted in 108.

If, as in step 110, the accelerator pedal position (APP) is medium or 50% from resting position, the accelerator pedal system 10 is considered by the vehicle control system 20 to be operating under failure conditions due to accelerator pedal 12 failure, as in step 112. The accelerator pedal 12 failure may be due to disturbances such as corrosion of the pedal arm 16 or mechanical interference with the accelerator pedal 12. The vehicle control system 20 will permit a power output, such as propulsive torque or acceleration of the motor vehicle, as depicted in 114, and the vehicle will enter a limited operating strategy (LOS). After a second predetermined time, a warning system is set to monitor the normal condition and to warn the driver of additional possible disturbances in the accelerator pedal system 10.

If, as in step 116, the accelerator pedal position (APP) is high (HI) or 100% from resting position, the accelerator pedal system 10 is considered by the vehicle control system 20 to be operating under failure conditions due to accelerator pedal 12 failure, as in step 118. The vehicle control system 20 will not permit a power output, as in step 120, and no propulsive torque will be allowed. The vehicle will shut down after a predetermined time.

In FIG. 2A, in step 100, the accelerator pedal system 10 determines whether the force-indicative output (SENS) is indicative of: (1) low or not engaged; (2) medium; or (3) high or fully engaged. If the vehicle control system 20 does not receive the signal that sensor output (SENS) is low, as shown in step 102, the vehicle control system 20 can determine that the force-indicative output (SENS) is medium, as in step 202 of FIG. 2B. Thereafter, the vehicle control system 20 interprets the accelerator pedal position (APP). If, as in step 204, the accelerator pedal position (APP) is low or 0% from resting position, the accelerator pedal system 10 is considered by the vehicle control system 20 to be operating under failure conditions due to possible sensor 14 error, as in step 206, and the accelerator pedal 12 is without error or without failure. The vehicle control system 20 will permit a reduced power output, such as propulsive torque or acceleration of the motor vehicle, as depicted in 208, and the vehicle will enter a limited operating strategy (LOS). After a second predetermined time, a warning system is set to monitor the normal condition and to send a notification to warn the driver if the failure condition indicates a vehicle safety issue, and/or of additional possible disturbances and sensor 14 error in the accelerator pedal system 10.

If, as in step 210, the accelerator pedal position (APP) is medium or 50% from resting position, the accelerator pedal system 10 is considered by the vehicle control system 20 to be operating under normal or non-failure conditions and the accelerator pedal 12 is without error or without failure, as in step 212. The vehicle control system 20 will permit a power output, such as propulsive torque or acceleration of the motor vehicle, as depicted in 214.

If, as in step 216, the accelerator pedal position (APP) is high or 100% from resting position, the accelerator pedal system 10 is considered by the vehicle control system 20 to be operating under failure conditions due to sensor 14 error, as in step 218, and the accelerator pedal 12 is without error or without failure. The vehicle control system 20 will permit a power output, as in step 220, and propulsive torque will be allowed.

In FIG. 2A, in step 100, the accelerator pedal system 10 determines whether the force-indicative output (SENS) is indicative of: (1) low or not engaged; (2) medium; or (3) high or fully engaged. If the vehicle control system 20 does not receive the signal that sensor output (SENS) is low, as shown in step 102, or medium as in step 202, the vehicle control system 20 can determine that the force-indicative output (SENS) is high, as in step 302 of FIG. 2C. Thereafter, the vehicle control system 20 interprets the accelerator pedal position (APP). If, as in step 304, the accelerator pedal position (APP) is low or 0% from resting position, the accelerator pedal system 10 is considered by the vehicle control system 20 to be operating under failure conditions due to possible sensor 14 error, as in step 306, and the accelerator pedal 12 is without error or without failure. The vehicle control system 20 will permit a reduced power output, such as propulsive torque or acceleration of the motor vehicle, as depicted in 308, and the vehicle will enter a limited operating strategy (LOS). After a second predetermined time, a warning system is set to monitor the normal condition and to warn the driver of additional possible disturbances and sensor 14 error in the accelerator pedal system 10.

If, as in step 310, the accelerator pedal position (APP) is medium or 50% from resting position, the accelerator pedal system 10 is considered by the vehicle control system 20 to be operating under possible failure conditions due to sensor 14 error, as in step 312, and the accelerator pedal 12 is without error or without failure. The vehicle control system 20 will permit a power output, such as propulsive torque or acceleration of the motor vehicle, as depicted in 314. After a second predetermined time, a warning system is set to monitor the normal condition and to send a notification to warn the driver if the failure condition indicates a vehicle safety issue, and/or of additional possible disturbances and sensor errors in the accelerator pedal system 10.

If, as in step 316, the accelerator pedal position (APP) is high or 100% from resting position, the accelerator pedal system 10 is considered by the vehicle control system 20 to be operating under normal conditions as in step 318. The vehicle control system 20 will permit a power output, as in step 320, and propulsive torque will be allowed.

Accordingly, as demonstrated by FIGS. 1 and 2A-2C, the present teachings can provide adjustable systems and methods for detecting accelerator pedal failure, to increase the safety of operation of the motor vehicle and meet driver expectation.

While the present teachings have been disclosed in terms of exemplary embodiments in order to facilitate better understanding of the present teachings, it should be appreciated that the present teachings can be embodied in various ways without departing from the principle of the teachings. Accordingly, while the present teachings have been disclosed in terms of using a sensor configured to interpret a force applied to an accelerator pedal, the teachings as disclosed work equally well for various quantities and types of sensors. For example, the present teachings additionally contemplate one or more sensors configured to interpret a force applied to an accelerator pedal and transmit a signal to a vehicle control system. The present teachings also contemplate one or more vehicle control systems configured to interpret signals from the sensors and interpret the accelerator pedal position in order to detect and correct an accelerator pedal failure condition. Therefore, the present teachings should be understood to include all possible embodiments which can be embodied without departing from the principle of the teachings set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A system for detecting accelerator pedal failure in an accelerator pedal system including a vehicle control system, the pedal failure detecting system comprising:
   an accelerator pedal;
   a pedal arm; and
   a sensor located on the accelerator pedal and configured to interpret a force applied to the accelerator pedal and further configured to transmit a signal as a sensor output to the vehicle control system,
   wherein the vehicle control system is configured to correlate the sensor output to an accelerator pedal position, and to indicate a failure condition in at least one of the sensor and the accelerator pedal when it is not feasible to read the sensor output given the accelerator pedal position,
   wherein the vehicle control system is configured to determine whether the failure condition is caused by an accelerator pedal disturbance, which interferes with movement of the accelerator pedal, and
   wherein the vehicle control system is configured to determine the presence of the accelerator pedal failure condition when the sensor output represents zero force and the measured accelerator pedal position is at a position other than a resting position.

2. The system of claim 1, wherein the vehicle control system is further configured to determine the presence of a pedal failure condition when the sensor output represents a low force and the accelerator pedal position is medium or at about 50% of a resting position.

3. The system of claim 1, wherein the vehicle control system is further configured to determine the presence of a pedal failure condition when the sensor output represents a low force and the accelerator pedal position is high or at about 100% of a resting position.

4. The system of claim 1, wherein the vehicle control system is further configured to determine the presence of a sensor error when the sensor output represents a high force and the accelerator pedal position is low or at about 0% of a resting position.

5. The system of claim 1, wherein the vehicle control system is further configured to determine the presence of a sensor error when the sensor output represents a medium force and the accelerator pedal position is low or at about 0% of a resting position.

6. The system of claim 1, wherein the vehicle control system is further configured to indicate a possible sensor error when the sensor output represents a medium force and the accelerator pedal position is high or at about 100% of a resting position.

7. The system of claim 1, wherein the vehicle control system is further configured to indicate a possible sensor error when the sensor output represents a high force and the accelerator pedal position is medium or at about 50% of a resting position.

8. The system of claim 1, wherein the accelerator pedal disturbance is due to corrosion of the pedal arm.

9. The system of claim 1, wherein the accelerator pedal disturbance is due to an improper mat placement.

10. The system of claim 1, wherein the sensor is configured to interpret the force according to a predetermined force measurement.

11. The system of claim 1, wherein the vehicle control system is further configured to transmit a notification to the driver if the failure condition indicates a vehicle safety issue.

12. A method for detecting accelerator pedal failure conditions in an accelerator pedal system, the method comprising:
   interpreting a force applied to the accelerator pedal with a sensor;
   transmitting a signal indicative of the force to a vehicle control system via the sensor;
   measuring an accelerator pedal position;
   correlating the signal with a measured accelerator pedal position with the vehicle control system to detect a failure condition or a non-failure condition;
   determining a failure condition, when present, is caused by an accelerator pedal disturbance when the signal represents zero force and the measured accelerator pedal position is at a position other than a resting position; and
   adjusting a power output of a motor vehicle with the vehicle control system based at least in part on the failure condition or non-failure condition.

13. The method of claim 12, wherein power output is permitted when the accelerator pedal system is operating under a non-failure condition.

14. The method of claim 12, wherein power output is not permitted when the accelerator pedal system is operating under a failure condition.

15. The method of claim 12, further comprising providing feedback notification if the failure condition indicates a safety issue.

16. The method of claim 12, further comprising providing a warning to a motor vehicle driver if the failure condition persists.

17. A system for detecting accelerator pedal failure, comprising:
- an accelerator pedal;
- a sensor operatively associated with and located on the pedal; and
- a vehicle control system configured to receive and compare a signal from the sensor indicative of a force applied to the pedal and a signal indicative of a position of the pedal,
- wherein the vehicle control system is further configured to determine a failure condition of the sensor and a failure condition of the pedal based on the comparison,
- wherein a failure condition of the pedal is caused by an accelerator pedal disturbance when the sensor signal represents zero force and the signal indicative of the pedal position indicates a pedal position other than a resting position.

18. A method for detecting accelerator pedal failure conditions, comprising:
- receiving by a vehicle control system a signal from a sensor located on an accelerator pedal indicative of a force applied to the accelerator pedal;
- comparing the signal with a measured position of the accelerator pedal using the vehicle control system;
- determining by the vehicle control system a failure and/or non-failure condition of each of the sensor and the pedal based on the comparison,
- wherein a failure and/or non-failure condition of the pedal is based, respectively, on the presence or absence of an accelerator pedal disturbance,
- wherein the presence of an accelerator pedal failure condition is indicated when the sensor signal represents zero force and the measured accelerator pedal position is at a position other than a resting position; and
- adjusting a power output of a motor vehicle with the vehicle control system based at least in part on the comparison.

19. The system of claim 17, wherein the vehicle control system is further configured to determine a failure condition of the sensor.

20. The system of claim 17, wherein the vehicle control system is further configured to transmit a notification to a driver if the failure condition indicates a vehicle safety issue.

21. The system of claim 1, wherein the controller is configured to determine the presence of the sensor failure condition when the sensor output represents a medium or high force and the measured accelerator pedal position is at a low position or a resting position.

* * * * *